United States Patent [19]
Gilman

[11] Patent Number: 5,936,784
[45] Date of Patent: Aug. 10, 1999

[54] MAGNIFYING DEVICE

[76] Inventor: Gary Duane Gilman, 1510 S. Utica St., Denver, Colo. 80219

[21] Appl. No.: 09/088,288

[22] Filed: Jun. 2, 1998

Related U.S. Application Data

[63] Continuation-in-part of application No. 08/800,525, Feb. 19, 1997, Pat. No. 5,777,805.
[51] Int. Cl.$^6$ .................................................. G02B 27/02
[52] U.S. Cl. ............................................ 359/803; 359/808
[58] Field of Search .................................... 359/803, 808, 359/802, 810

[56] References Cited

U.S. PATENT DOCUMENTS

| | | | |
|---|---|---|---|
| 4,206,978 | 6/1980 | Leopoldi | 359/808 |
| 5,331,472 | 7/1994 | Rassman | 359/894 |
| 5,777,805 | 7/1998 | Gilman | 359/803 |

*Primary Examiner*—Hung Xuan Dang
*Attorney, Agent, or Firm*—R. William Graham

[57] ABSTRACT

A magnifying device includes a translucent member having a first portion of a predetermined size and having a first end having a predetermined convex shaped surface and second end defining a surface portion, a second portion of a predetermined size and having a diameter substantially equivalent in diameter to the second end of the first portion and having a first end generally defining a surface portion concentrically integrally formed adjacent with the second end of the first portion and having second end defining a surface portion, a third portion of a predetermined size having a first end generally defining a surface portion integrally formed adjacent with the second end of the second portion and having a second end of a predetermined smaller diameter than the first end of the third portion and defining a generally planar surface portion, wherein an angle is formed between the second end of the first portion and the second end of the third portion such that when viewing from the first end of the first portion through to the second end of the third portion a substantially magnified focused region is formed substantially at the second end of the third portion by virtue of the predetermined sizes.

12 Claims, 3 Drawing Sheets

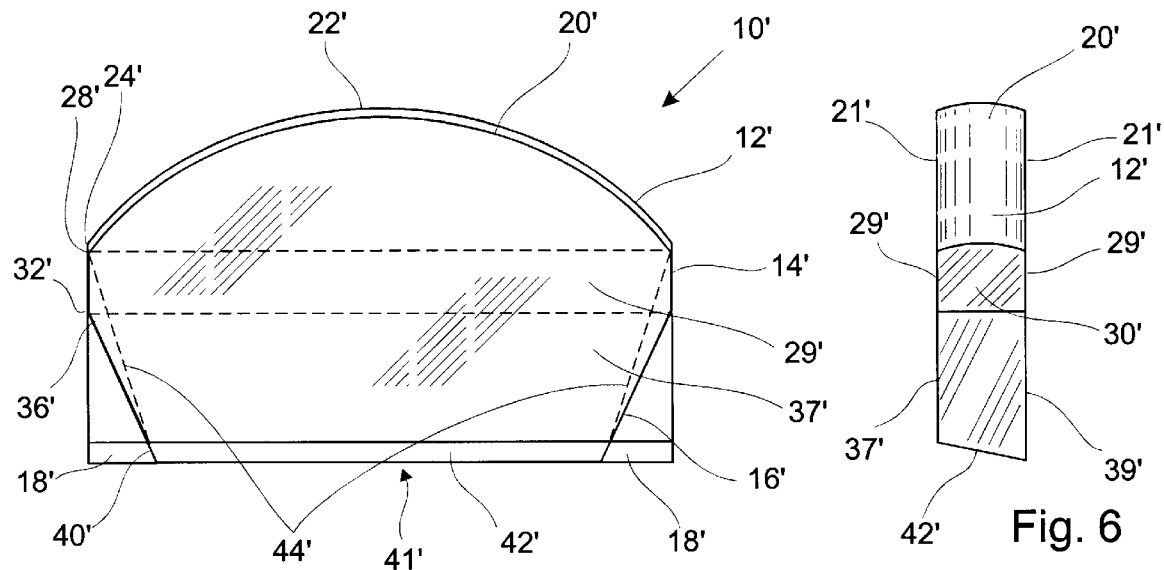
Fig. 5
Fig. 6
Fig. 4
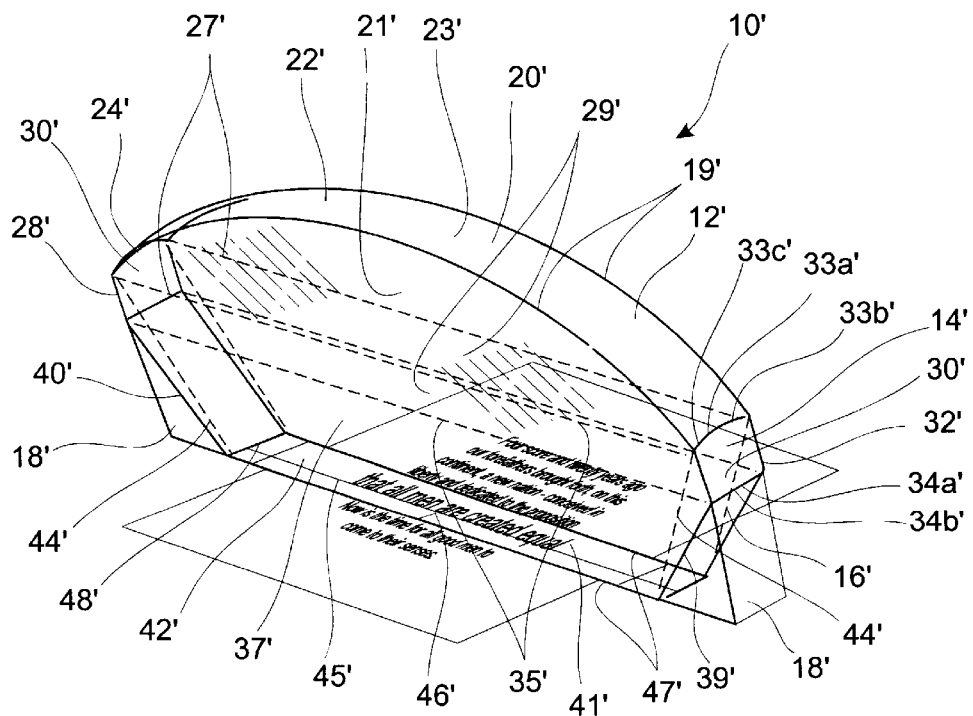

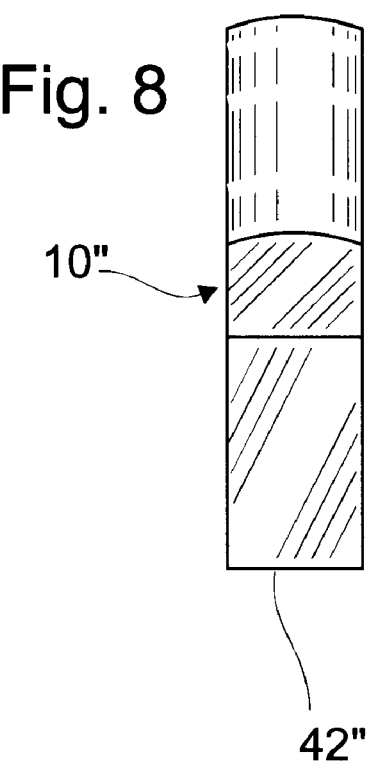
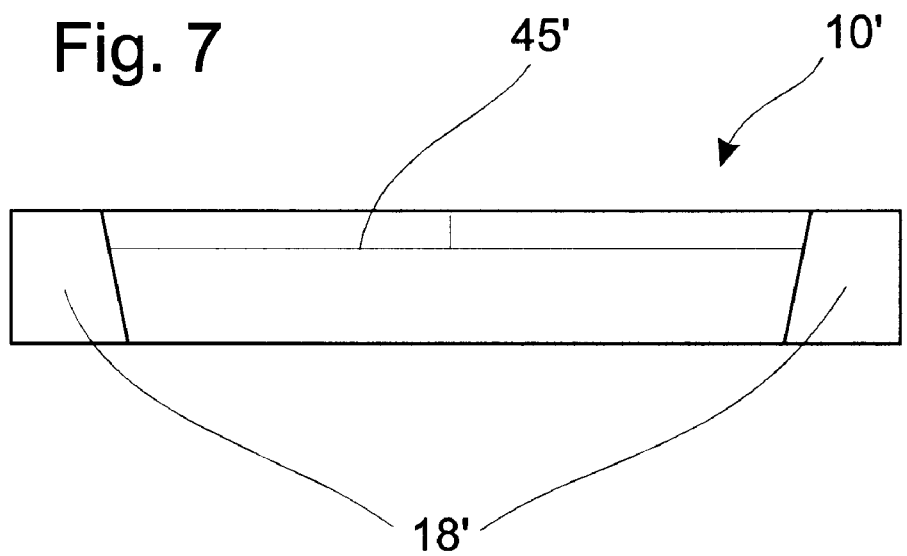

MAGNIFYING DEVICE

This is a continuation-in-part of U.S. Ser. No. 08/800,525 filed Feb. 19, 1997 now U.S. Pat. No. 5,777,805.

BACKGROUND OF THE INVENTION

1. Field of the Invention

The present invention relates to the field of visual aids. More particularly, but not by way of limitation, the invention relates to a magnifying device particularly well suited for direct application onto a printed substrate for magnifying the print thereon without the print appearing blurred.

2. Related Art

There exist in the field of visual aids a number of magnifying devices. Such devices commonly employ a disc shaped transparent member, such as glass, having a pair of convex sides which is referred to as a lens. The lens is usually retained by a ring member which is connected to a handle. This type of magnifying device requires the user to continuously hold the device over the viewed printed substrate at a given focal point of the device. This is tiresome and difficult in some applications wherein the user may also have to operate a transportation vehicle, such as a plane or auto. If placed on the map, such devices create a visual blurring of the text with the exception of a relatively small focal region. Further, there is a need to provide a magnifying device which overcomes these problems in a manner which is more user friendly.

Accordingly, there remains a need for improvement in the field of visual aids. The present invention solves the problems above.

BRIEF SUMMARY OF THE INVENTION

It is an object to improve visual aids.

It is another object to improve magnifying devices.

It is another object to ease the use of magnifying devices while increasing the effective focal region.

Accordingly, the present invention is directed to a magnifying device. The magnifying device includes a translucent member having a first portion of a predetermined size which includes a first end having a predetermined convex shaped surface and second end defining a surface portion, a second portion of a predetermined size and having a diameter substantially equivalent in diameter to the second end of the first portion and having a first end generally defining a surface portion integrally formed adjacent with the second end of the first portion and having second end defining a surface portion, a third portion of a predetermined size having a first end generally defining a surface portion integrally formed adjacent with said second end of said second portion and having a second end of a predetermined smaller diameter than the first end of the third portion and defining a surface portion. An angle is formed between the second end of the first portion and the second end of the third portion such that when viewing from the convex end of the first portion through to the second end of the third portion a substantially magnified focused region is formed substantially at the second end of the third portion by virtue of the predetermined sizes and focal lengths between substantially any given point on the first end and the second end of the third portion. In one embodiment, the surface portions between the first, second and third portions are circular shaped and the angle is frustoconical. In another embodiment, the device is further characterized such that the first portion, second portion and third portion each include sides interconnecting the ends of the portions. The surface portions between the first, second and third portions are polygonal. The magnifying device also preferably includes a magnetic portion connected to the device.

Other objects and advantages will be readily apparent to those skilled in the art upon viewing the drawings and reading the detailed description hereafter.

BRIEF DESCRIPTION OF THE DRAWINGS

FIG. 4 is a perspective view of another embodiment of the present invention.

FIG. 5 is a side view of FIG. 4 of the present invention.

FIG. 6 is an end view of FIG. 4 of the present invention.

FIG. 7 is bottom view of FIG. 4 of the present invention.

FIG. 8 is an end view of still another embodiment of the present invention

DETAILED DESCRIPTION OF THE INVENTION

Figure 1:
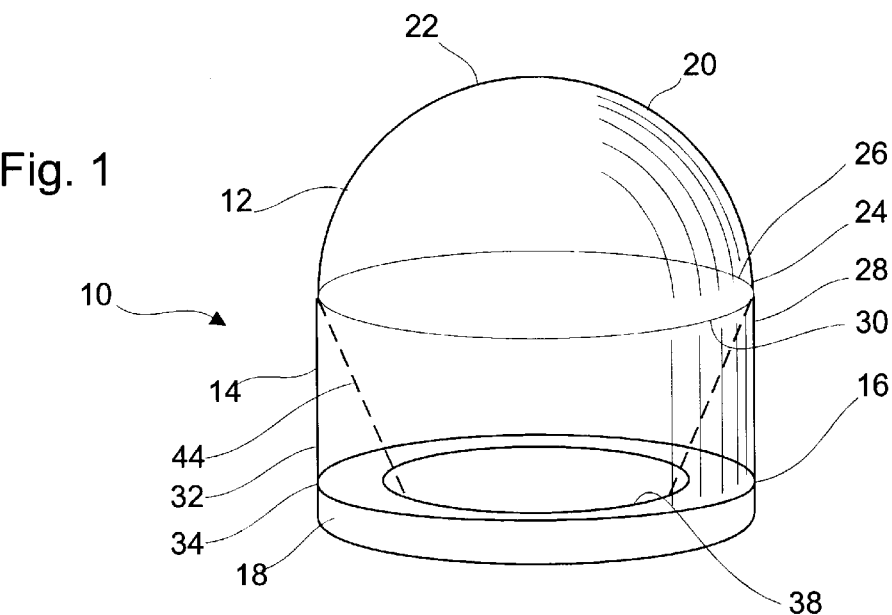
FIG. 1 is a perspective view of one embodiment of the present invention.

Referring now to the drawings, one embodiment of the present invention is directed to a magnifying device and is generally designated by the numerals 10, 10' and 10". The magnifying device 10, 10' and 10" is made of generally translucent material. The magnifying device 10 includes a first portion 12, second portion 14 and third portion 16. The magnifying device 10 also includes a magnetic portion 18.

The first portion 12 is of a predetermined size and has a first end 20 having a predetermined convex shaped surface and has an apex surface point 22 and second end 24 defining a circle surface portion 26. The convex shaped surface is shown as generally hemispherical, but it is contemplated that other arcuate surfaces may be operational by varying dimensions of portions 14 and 16 of the present invention.

The second portion 14 is generally cylindrical and of a predetermined size to permit a focusing objective set forth herein and in this embodiment has a diameter substantially equal to the diameter of the second end 24 of the first portion 12. The second portion 14 has a first end 28 generally defining a circle surface portion 30 concentrically integrally formed adjacent with the second end 24 of the first portion 12 and has a second end 32 defining a circle surface portion 34.

The third portion 16 is of a predetermined size and has a first end 36 generally defining a circle surface portion 38 and is concentrically integrally formed adjacent with the second end 32. The third portion 16 has a second end 40 of a predetermined smaller diameter than the first end 36 and defines a generally planar circular surface portion 42. A frustoconical angle 44 is formed between the ends 24, 36 and 40 of the third portion 16 such that when viewing from the convex end 20 of the first portion 12 through to the second end 40 of the third portion 16 a substantially magnified focused region 41 is formed substantially at the second end 40 by virtue of the predetermined sizes, arcuate surface of convex end 20 and focal length existing between substantially any given point on the convex end 20 and any given point on the planar circular surface portion 42.

In another embodiment, the magnifying device 10' includes a first portion 12', second portion 14' and third portion 16'. The magnifying device 10' also includes a magnetic portion 18'.

The first portion 12' is of a predetermined size and has a first end 20' defining a predetermined convex polygonal surface having arcuate edges 19' and 33'a with an apex surface point 22'. The first portion also has a second end 24' which defines a polygonal surface portion having two straight edges 27' and two arcuate edges 33'b. Sides 21' interconnect the first end 20' and the second end 24'. Here, the convex shape is generally shown as a slice of a hemispherical shape.

The second portion 14' is of a predetermined size and has a length substantially equal to the diameter of the second end 24' of the first portion 12'. The second portion 14' has a first end 28' generally defining a polygonal surface portion having two straight edges 27" and two arcuate edges 33'c which are integrally formed adjacent with the second end 24' of the first portion 12' and has a second end 32' defining a rectangular surface portion having four edges 34'a and 35'a. Sides 29' and 30' interconnect the first end 28' and the second end 32'.

The third portion 16' is of a predetermined size and has a first end 36' generally defining a rectangular surface portion having four edges 34'b and 35'b and is integrally formed adjacent with the second end 32'. The third portion 16' has a second end 40' of a predetermined smaller length than the first end 36' and defines a generally planar rectangular surface portion 42' and has four edges 47' and 48'. Third portion 16' also has sides 37' and 39' interconnecting the first end 36' and the second end 40'.

A tapered angle 44' is formed between the ends 24' of the first portion 12' and 40' of the third portion 16' such that when viewing from the end 20' of the first portion 12' through to the second end 40' of the third portion 16', a substantially magnified focused region 41' is formed substantially at the second end 40' by virtue of the predetermined sizes, convex shaped first end 20' and focal length existing between substantially any given point on the convex shaped end first 20' and any given point on the generally planar rectangular surface portion 42'. Further, one of the sides 37' can be formed slightly longer than the other side 37' to cause the surface 42' to appear beveled. This is useful to the viewer in that it aids viewing of the text by sloping the end 20' of the magnifying device 10' toward the viewer, thus reducing neck strain in addition to eye strain.

Additionally, there is preferably formed in or on the surface 42' (or 42) a reference line 45'. The reference line 45' is etched into the surface 42' and extends transversely across the surface 42 through a midpoint 46'. This reference line 45' is relatively thin and does not interfere with viewing text which is adjacent the surface 42'.

The frustoconical angle 44 as well as the tapered angle 44' formed between the portions 14 and 16 and 14' and 16', respectively, aid in preventing the viewer from seeing blurred text caused by the reflective pattern of light which one would normally see if positioned at a normal distance, i.e., a foot or more away, viewing the printed surface through a hemispherical translucent magnifying device or conventional double sided convex lens. The tendency of the eye is to capture all that is viewable or magnified and the frustoconical angle 44 as well as the tapered angle 44' aid the present invention to filter out text which would normally appear blurred to user when positioned and viewing the printed surface through the device.

In operation, the magnifying device 10 (10') is disposed on a printed substrate to be viewed, e.g., a map or a document, with the end 40 (40') disposed adjacent to the map. The reference line 45' may be used to easily track the line of text to be viewed. By so providing, the present invention permits a clear and focused view within the entire region 41 (41') of the portion 42 (42') without any substantial blurring effect within the focused region 41 (41') and thus prevents eye strain on the user. Moreover, the user does not have to bother with focusing the magnifying device 10 because of the predetermined focused region 41 (41') is stable once slidably positioned on the viewed surface.

Figure 2:
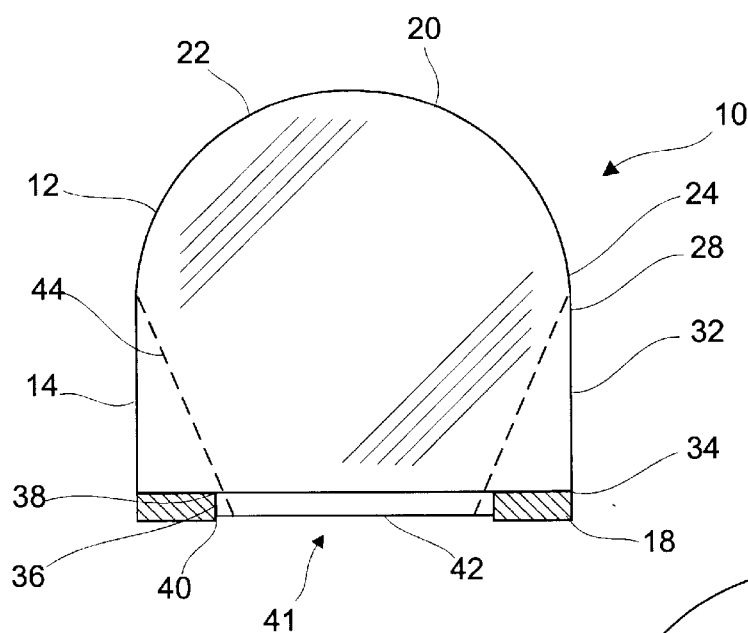
FIG. 2 is a side cross-sectional view of FIG. 1 of the present invention.
Figure 3:
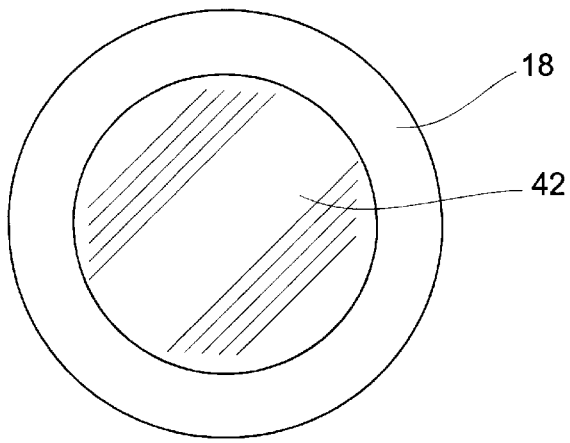
FIG. 3 is a bottom view of FIG. 1 of the present invention.

In the case of FIGS. 1–3, the magnetic portion 18 is preferably of an annular configuration to conform about the third portion 16 between the ends 36 and 40. For FIGS. 4–7, the magnetic portion 18' includes two pie shaped pieces. The magnetic portion 18 (18') can be connected to the third portion 16 (16') by an adhesive material 44, for example, which can be of any type to accomplish the fixation thereof preferably in a permanent fashion. The magnetic portion 18 (18) also preferably is configured to permit direct printing thereon or the affixation of a printed material thereon for the purpose of providing an advertising mechanism. Another advantage gained by the magnetic portion is to aid in the ability to fix orientation of the magnifying device 10 (10') onto a map or the like having a metallic backing.

The above described embodiments are set forth by way of example and are not for the purpose of limiting the present invention. It will be readily apparent to those skilled in the art that obvious modifications, derivations and variations can be made to the embodiments without departing from the scope of the invention. For example, the shape of the magnifying device may take on other suitable geometric configurations to accomplish the objectives stated herein. Accordingly, the claims appended hereto should be read in their full scope including any such modifications, derivations and variations.

What is claimed is:

1. A magnifying device, which includes:

a first translucent portion of a predetermined size which includes a first end defining predetermined arcuate shaped surface, a second end defining a surface portion, a first side and a second side interconnecting said first end and said second end;

a translucent second portion of a predetermined size and having a diameter substantially equal in diameter to said second end of said first portion and having a first end defining a surface portion integrally formed adjacent with said second end of said first portion and having second end defining a surface portion, and further having a four sides interconnecting said first end and said second end of said second portion; and a third translucent portion of a predetermined size having a first end generally defining a surface portion integrally formed adjacent with said second end of said second portion and having a second end of a predetermined smaller diameter than said second end of said second portion and defining a generally planar base surface portion, and further having a four sides interconnecting said first end and said second end of said third portion, wherein an angle is formed between said second end of said first portion and said second end of said third portion such that when viewing from said first end of said first portion through to said second end of said third portion a substantially magnified focused region is formed substantially at said planar base surface portion of said second end of said third portion.

2. The magnifying device of claim 1, which further includes a magnetic portion connected to said device in a nonobstructing manner with respect to said focused region.

3. The magnifying device of claim 2, wherein said magnetic portion has a printed surface thereon which is readily viewable.

4. The magnifying device of claim 2, wherein said magnetic portion is disposed adjacent and between said ends of said third portion.

5. The magnifying device of claim 1, wherein said a focal length exists between substantially any given point on said first end and any given point on said planar base surface portion.

6. The magnifying device of claim 1, wherein said base surface portion has a relatively thin reference line transversely extending thereacross to aid in the viewing of text.

7. A magnifying device, which includes:

- a first translucent portion of a predetermined size which includes a first end defining a predetermined arcuate shaped polygonal surface portion, a second end defining a polygonal surface portion, a first side and a second side, a first side and a second side interconnecting said first end and said second end;
- a translucent second portion of a predetermined size and having a diameter substantially equal in diameter to said second end of said first portion and having a first end defining a defining a polygonal surface portion and which is integrally formed adjacent with said second end of said first portion and having second end defining a generally rectangular surface portion, and further having a four sides interconnecting said first end and said second end of said second portion; and
- a third translucent portion of a predetermined size having a first end generally defining a rectangular surface portion integrally formed adjacent with said second end of said second portion and having a second end of a predetermined smaller diameter than said second end of said second portion and defining a generally rectangular planar base surface portion, and further having a four sides interconnecting said first end and said second end of said third portion, wherein a tapered angle is formed between said second end of said first portion and said second end of said third portion such that when viewing from said first end of said first portion through to said second end of said third portion a substantially magnified focused region is formed substantially at said rectangular planar base surface portion of said second end of said third portion.

8. The magnifying device of claim 7, which further includes a magnetic portion connected to said device in a nonobstructing manner with respect to said focused region.

9. The magnifying device of claim 8, wherein said magnetic portion has a printed surface thereon which is readily viewable.

10. The magnifying device of claim 8, wherein said magnetic portion is disposed adjacent and between said ends of said third portion.

11. The magnifying device of claim 7, wherein said a focal length exists between substantially any given point on said first end and any given point on said rectangular planar base surface portion.

12. The magnifying device of claim 7, wherein said base surface portion has a relatively thin reference line transversely extending thereacross to aid in the viewing of text.

* * * * *